(12) United States Patent
Miyake et al.

(10) Patent No.: US 11,376,964 B2
(45) Date of Patent: Jul. 5, 2022

(54) VEHICLE DISPLAY DEVICE INCLUDING PASSAGE EXTENDING THROUGH OPTICAL MEMBER

(71) Applicant: Yazaki Corporation, Tokyo (JP)

(72) Inventors: Yuta Miyake, Shizuoka (JP); Kenji Yagi, Shizuoka (JP); Naohisa Murata, Shizuoka (JP); Yusuke Sugiura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 64 days.

(21) Appl. No.: 17/082,022

(22) Filed: Oct. 28, 2020

(65) Prior Publication Data

US 2021/0129671 A1    May 6, 2021

(30) Foreign Application Priority Data

Oct. 31, 2019  (JP) ............................. JP2019-198846

(51) Int. Cl.
*B60K 35/00*    (2006.01)
*G02B 27/01*    (2006.01)
*G02F 1/1335*    (2006.01)

(52) U.S. Cl.
CPC .......... *B60K 35/00* (2013.01); *G02B 27/0101* (2013.01); *G02F 1/133512* (2013.01);
(Continued)

(58) Field of Classification Search
CPC ............ B60K 35/00; B60K 2370/1529; B60K 2370/334; B60K 2370/48; B60K 2370/23; B60K 2370/25; B60K 2370/52; B60K 2370/785; G02B 27/0101; G02B 27/0006; G02F 1/133512; G02F 1/133553; G02F 1/1336; G03B 21/28; H05K 7/20954
See application file for complete search history.

(56) References Cited

U.S. PATENT DOCUMENTS 10,509,460 B2 * 12/2019 Kumar ................... G06V 20/20
10,809,558 B2 * 10/2020 Miyake .............. G02B 27/0101
(Continued)

FOREIGN PATENT DOCUMENTS

JP    S63-189826 U    12/1988
JP    2011-88583 A    5/2011
(Continued)

*Primary Examiner* — Tracie Y Green
(74) *Attorney, Agent, or Firm* — Kenealy Vaidya LLP

(57) ABSTRACT

A vehicle display device includes a display device, a reflecting mirror, an optical sensor configured to detect external light, and a controller configured to enable execution of a temperature lowering operation. The display device includes a light transmissive liquid crystal display unit disposed on an optical path of light emitted from a light source and a first optical member disposed between the liquid crystal display unit and the light source and configured to change an optical path of light that enters the first optical member from the light source and passes therethrough toward the liquid crystal display unit. The optical sensor is disposed on an optical path of the external light incident on the display device at a side opposite to the liquid crystal display unit across the first optical member. The first optical member includes a passage on an optical path through which the external light passes.

14 Claims, 9 Drawing Sheets

(52) U.S. Cl.
CPC .......... *G02F 1/133553* (2013.01); *B60K 2370/1529* (2019.05); *B60K 2370/334* (2019.05); *B60K 2370/48* (2019.05)

(56) References Cited

U.S. PATENT DOCUMENTS

| | | |
|---|---|---|
| 2015/0098029 A1 | 4/2015 | Sato et al. |
| 2015/0234218 A1* | 8/2015 | Aoyama .......... H04B 10/116 349/33 |
| 2019/0011712 A1* | 1/2019 | Nagano .......... G09G 3/001 |
| 2021/0243419 A1* | 8/2021 | Kusafuka .......... B60K 35/00 |

FOREIGN PATENT DOCUMENTS

| | | |
|---|---|---|
| JP | 2011-150990 A | 8/2011 |
| JP | 2013-228442 A | 11/2013 |
| JP | 2015-152746 A | 8/2015 |

\* cited by examiner

FIG.2
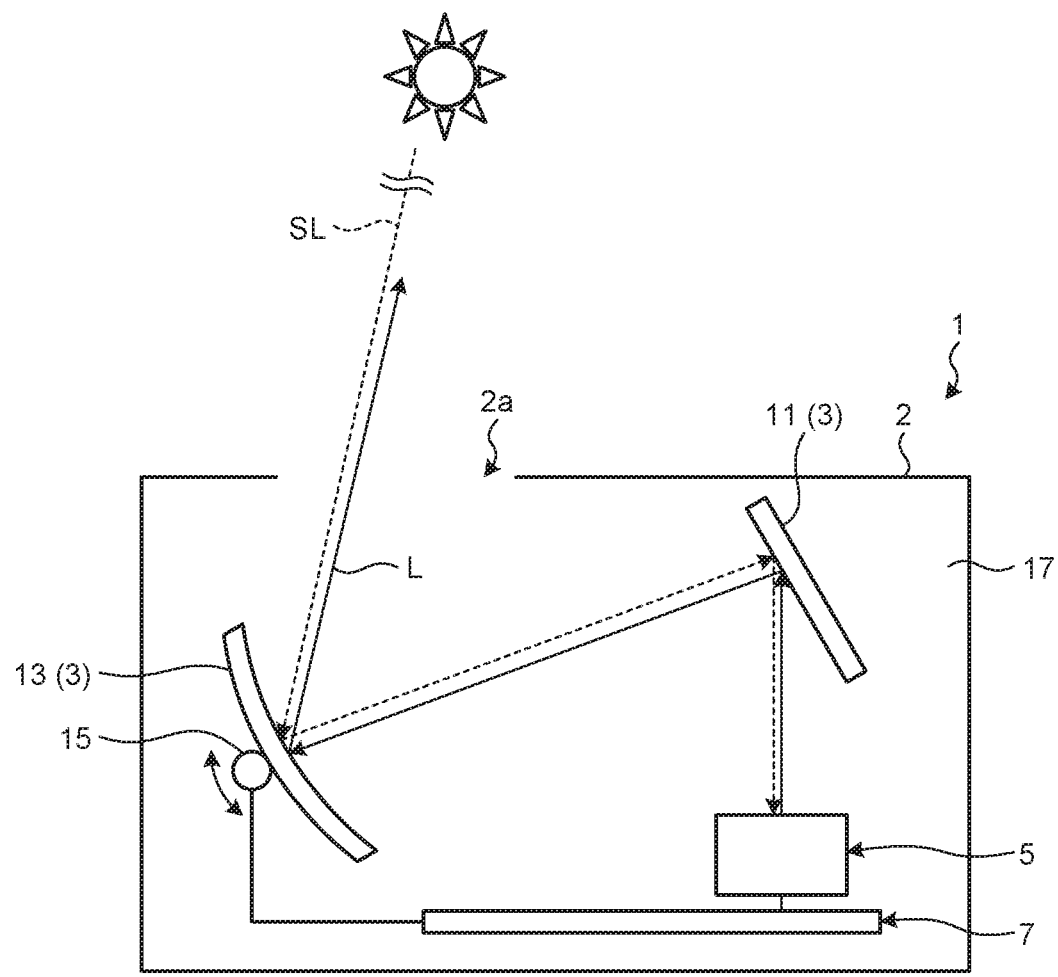
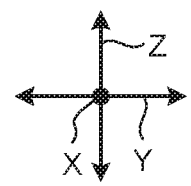

FIG.4
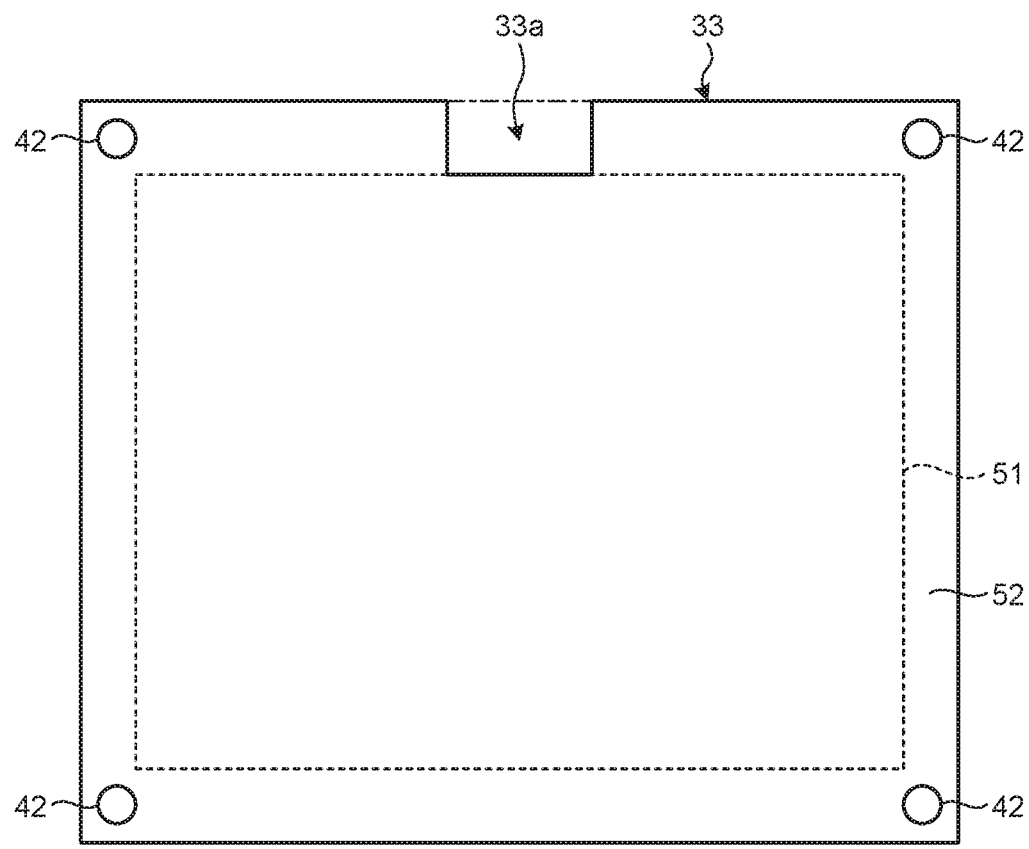
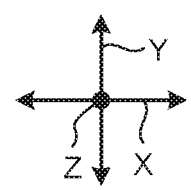

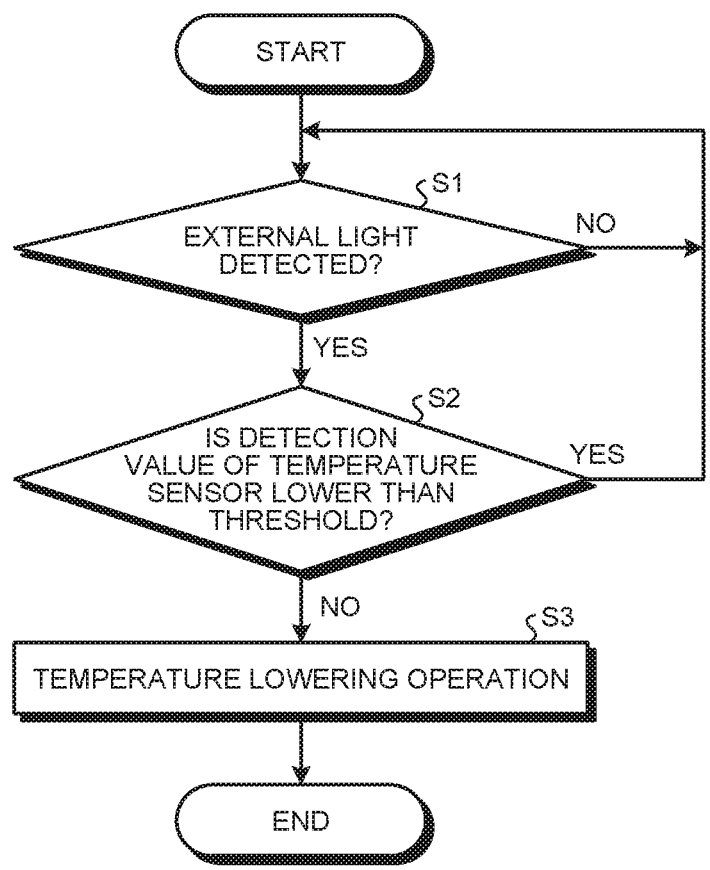

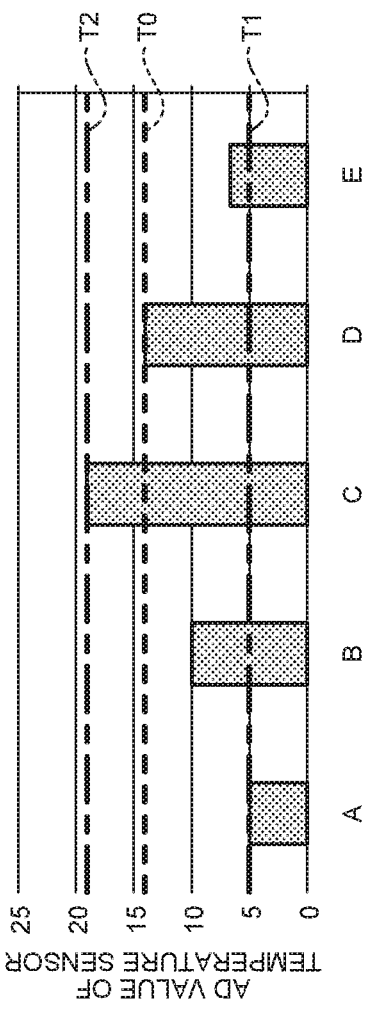

| | A | B | C | D | E | F | G |
|---|---|---|---|---|---|---|---|
| DETECTION RESULT OF OPTICAL SENSOR | NOT DETECTED | DETECTED | DETECTED | DETECTED | DETECTED | DETECTED | NOT DETECTED |
| COMPARISON RESULT BETWEEN DETECTION VALUE OF TEMPERATURE SENSOR AND THRESHOLD | LOWER THAN THRESH- OLD | LOWER THAN THRESH- OLD | THRESH- OLD OR HIGHER | LOWER THAN THRESH- OLD | LOWER THAN THRESH- OLD | LOWER THAN THRESH- OLD | LOWER THAN THRESH- OLD |
| ENVIRONMENTAL TEMPERATURE | NOK | NOK | NOK | NOK | NOK | OK | OK |
| TEMPERATURE LOWERING OPERATION | NOT EXECUTED | NOT EXECUTED | EXECUTED | NOT EXECUTED | NOT EXECUTED | NOT EXECUTED | NOT EXECUTED |

VEHICLE DISPLAY DEVICE INCLUDING PASSAGE EXTENDING THROUGH OPTICAL MEMBER

CROSS-REFERENCE TO RELATED APPLICATION(S)

The present application claims priority to and incorporates by reference the entire contents of Japanese Patent Application No. 2019-198846 filed in Japan on Oct. 31, 2019.

BACKGROUND OF THE INVENTION

1. Field of the Invention

The present invention relates to a vehicle display device.

2. Description of the Related Art

Some known vehicles, such as motor vehicles, are equipped with a head-up display (HUD) device. The HUD device projects a display image displayed on a display device onto a windshield or a combiner through, for example, a reflecting mirror so that a driver visually recognizes the display image as a virtual image. When a display image displayed on the display device inside a housing is projected onto, for example, a windshield outside the housing, the HUD device is provided with an opening on the upper part of the housing. For example, when external light, such as sunlight, enters the housing through the opening and reaches the display device through, for example, the reflecting mirror, a light collecting action of the reflecting mirror may cause overheating of the display device.

In a known HUD device, a temperature sensor detects a temperature rise in the display device caused by external light. When the temperature of the display device exceeds a threshold temperature, the HUD device, for example, dims or turns off lighting of the display device, or changes the angle of the reflecting mirror to reduce the temperature rise in the display device. However, the temperature rise in the display device cannot be reduced at an appropriate timing because the dimming or the like of lighting of the display device is performed after the temperature of the display device exceeds the threshold temperature. Thus, there has been disclosed a technique that detects infrared rays included in external light using an infrared sensor to reduce a temperature rise at an appropriate timing (e.g., refer to Japanese Patent Application Laid-open. No. 2013-228442).

The method that detects external light using the infrared sensor disposed on the back face of the reflecting mirror does not detect external light actually applied to the display device. Thus, it is difficult to precisely grasp the application of external light to the display device, and the method is thus susceptible to improvement in this point.

SUMMARY OF THE INVENTION

The present invention has been made in view of the above problem, and an object thereof is to provide a vehicle display device that prevents optical deterioration of a display device caused by external light and prevents breakage of the display device caused by external light.

In order to solve the above mentioned problem and achieve the object, a vehicle display device according to one aspect of the present invention includes a display device configured to emit, as display light, a display image to be projected onto a projected member disposed outside the vehicle display device; at least one reflecting mirror disposed on an optical path of the display light from the display device to the projected member and configured to reflect the display light; an optical sensor configured to detect external light that enters the display device through an opening allowing the outside and an internal space to communicate with each other and through the reflecting mirror; and a controller configured to enable execution of a temperature lowering operation for lowering a temperature of the display device when the optical sensor detects the external light, wherein the display device includes: a light source; a light transmissive liquid crystal display element disposed on an optical path of light emitted from the light source; and a first optical member disposed between the liquid crystal display element and the light source and configured to change an optical path of light that enters from the light source and passes through the first optical member toward the liquid crystal display element, the optical sensor is disposed on an optical path of external light incident on the display device at a side opposite to the liquid crystal display element across the first optical member, and the first optical member includes a passage on an optical path through which the external light passes.

According to another aspect of the present invention, in the vehicle display device, it is preferable that the display device further includes a second optical member disposed between the liquid crystal display element and the first optical member and configured to change light that enters from the first optical member and passes through the second optical member toward the liquid crystal display element, and the second optical member transmits the external light.

According to still another aspect of the present invention, in the vehicle display device, it is preferable that the first optical member includes: a transmissive area configured to transmit light applied to the transmissive area from the light source; and a non-transmissive area other than the transmissive area, and the non-transmissive area includes the passage.

According to still another aspect of the present invention, in the vehicle display device, it is preferable that the display device further includes a light-shielding wall disposed between the light source and the optical sensor and configured to block light emitted from the light source.

According to still another aspect of the present invention, in the vehicle display device, it is preferable that the optical sensor is an infrared sensor.

According to still another aspect of the present invention, in the vehicle display device, it is preferable that the vehicle display device includes a temperature sensor configured to detect the temperature of the display device, wherein the controller restricts execution of the temperature lowering operation when the optical sensor detects the external light, and a detection value of the temperature sensor is lower than a threshold.

According to still another aspect of the present invention, in the vehicle display device, it is preferable that the vehicle display device includes a temperature sensor disposed at least inside a vehicle and disposed outside the vehicle display device, wherein the controller restricts execution of the temperature lowering operation when the optical sensor detects the external light, and a detection value of the temperature sensor is lower than a threshold.

In order to solve the above mentioned problem and achieve the object, a vehicle display device according to still another aspect of the present invention includes a display device configured to emit, as display light, a display image to be projected onto a projected member disposed outside a vehicle display device; at least one reflecting mirror disposed on an optical path of the display light from the display device to the projected member and configured to reflect the display light; an infrared sensor configured to detect external light that enters the display device through an opening allowing the outside and an internal space to communicate with each other and through the reflecting mirror; a temperature sensor configured to detect a temperature of the display device; and a controller configured to enable execution of a temperature lowering operation for lowering the temperature of the display device in accordance with a detection result of the infrared sensor and a detection result of the temperature sensor, wherein the display device includes: a light source; a light transmissive liquid crystal display element disposed on an optical path of light emitted from the light source; and a first optical member disposed between the liquid crystal display element and the light source and configured to change an optical path of light that enters from the light source and passes through the first optical member toward the liquid crystal display element, the infrared sensor is disposed on an optical path of external light incident on the display device at a side opposite to the liquid crystal display element across the first optical member, the first optical member includes a passage on an optical path through which the external light passes, and the controller enables execution of the temperature lowering operation when the infrared sensor detects the external light, and a detection value of the temperature sensor is equal to or higher than a threshold and restricts execution of the temperature lowering operation when the infrared sensor detects the external light, and the detection value of the temperature sensor is lower than a threshold.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic diagram illustrating the schematic configuration of the vehicle display device according to the first embodiment;

FIG. 4 is a schematic diagram illustrating the schematic configuration of a first optical member according to the first embodiment;

FIG. 5 is a flowchart illustrating an example of a control operation of a controller according to the first embodiment;

FIG. 6A is a graph illustrating the relationship between a detection value of a temperature sensor and a threshold, and FIG. 6B is a table illustrating the relationship between detection results of an optical sensor and the temperature sensor, an environmental temperature, and a temperature lowering operation;

DETAILED DESCRIPTION OF THE PREFERRED EMBODIMENTS

Hereinbelow, embodiments of a vehicle display device according to the present invention will be described in detail with reference to the drawings. Note that the present invention is not limited to the embodiments. Further, elements in the following embodiments include elements readily conceivable by those skilled in the art and substantially identical elements. Furthermore, various omissions, replacements, and modifications of the elements in the following embodiments can be performed without departing from the gist of the invention.

First Embodiment

Figure 1:
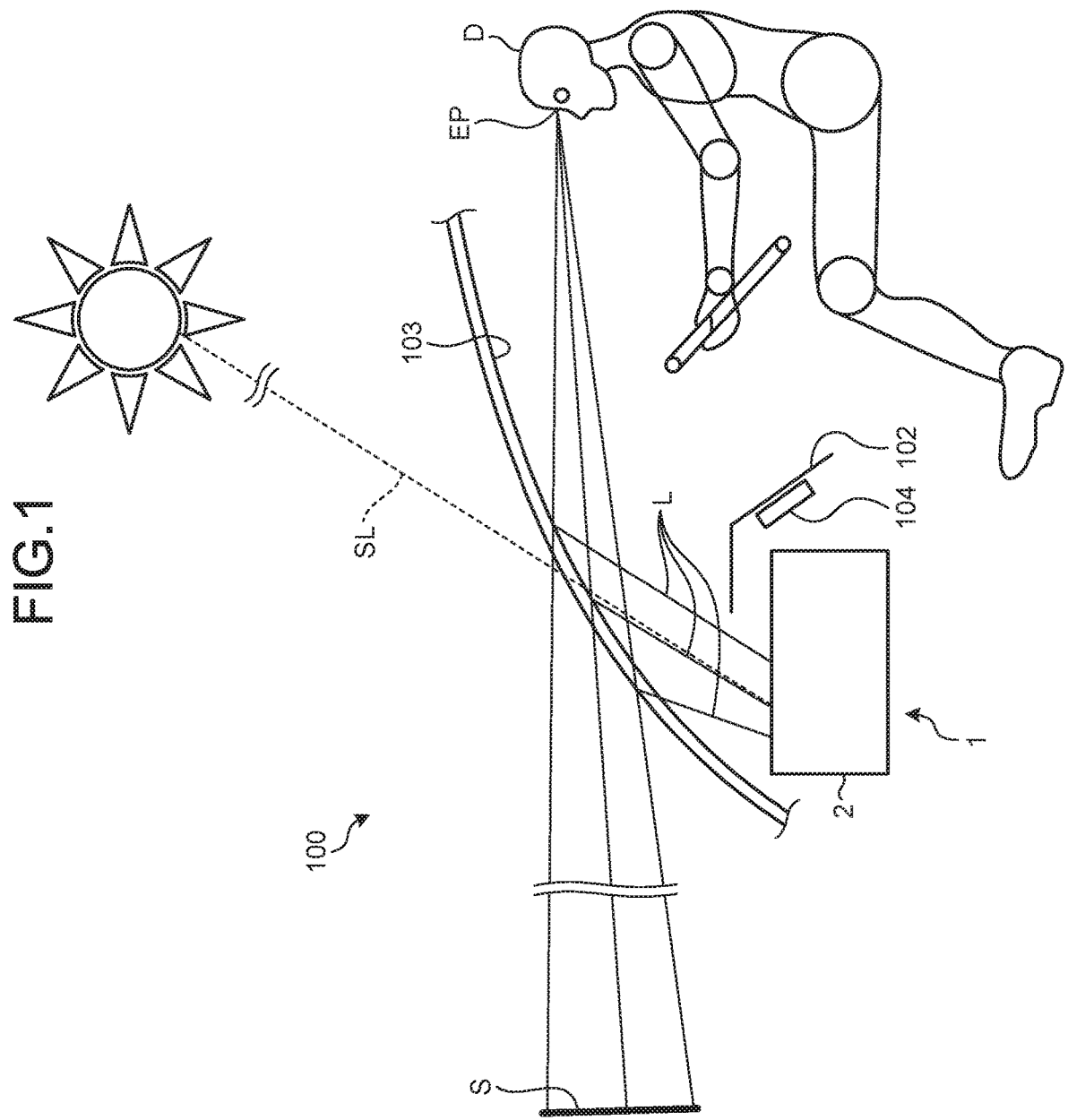
FIG. 1 is a schematic diagram illustrating an example of a vehicle display device according to a first embodiment when the vehicle display device is mounted on a vehicle.
Figure 3:
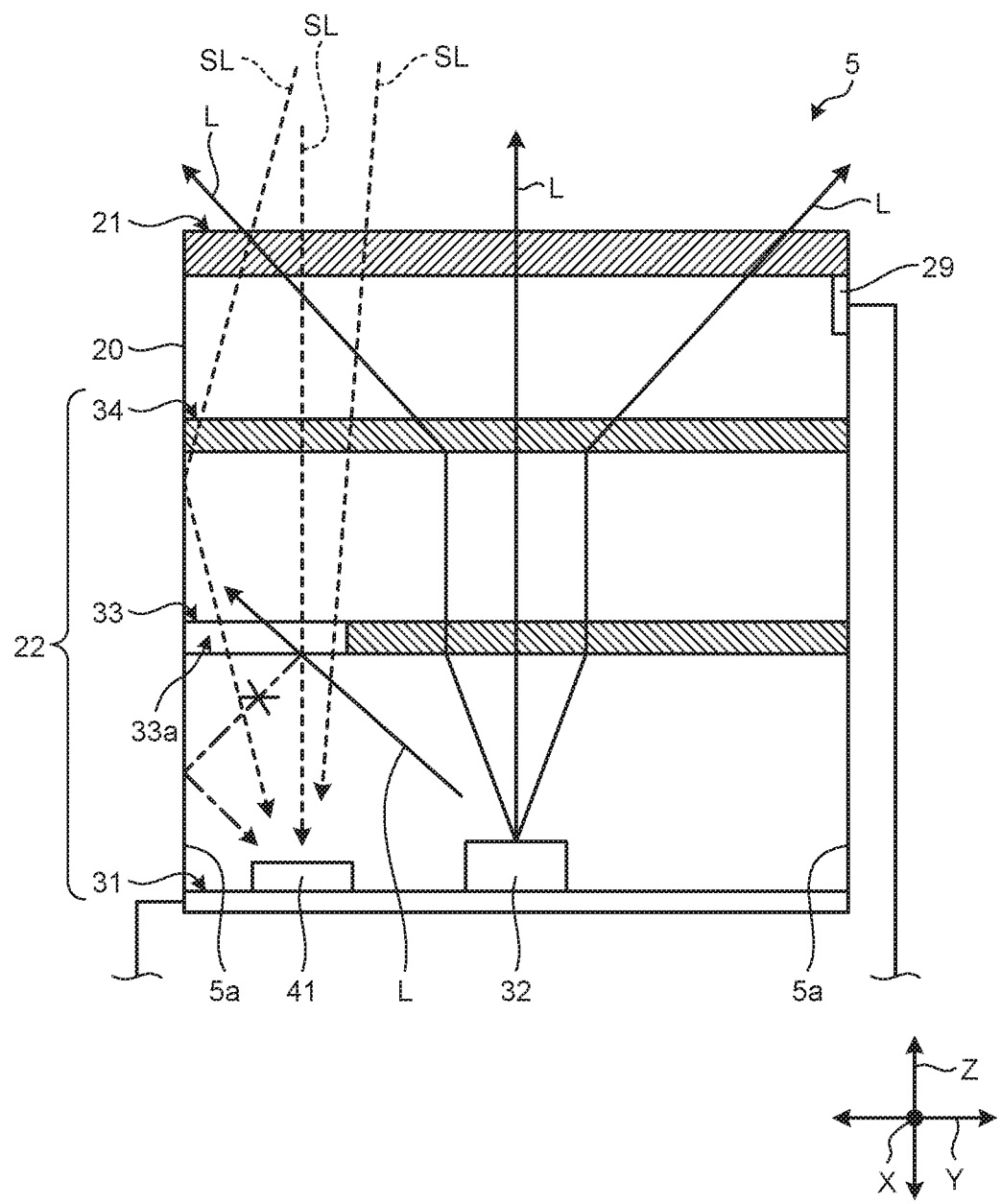
FIG. 3 is a schematic diagram illustrating the schematic configuration of a display device according to the first embodiment.

A vehicle display device according to the present invention will be described with reference FIGS. 1 to 6A and 6B. FIG. 1 is a schematic diagram illustrating an example of the vehicle display device according to the first embodiment when the vehicle display device is mounted on a vehicle. FIG. 2 is a schematic diagram illustrating the schematic configuration of the vehicle display device according to the first embodiment. FIG. 3 is a schematic diagram illustrating the schematic configuration of a display device according to the first embodiment. FIG. 4 is a schematic diagram illustrating the schematic configuration of a first optical member according to the first embodiment. FIG. 5 is a flowchart illustrating an example of a control operation of a controller according to the first embodiment. FIG. 6A is a graph illustrating the relationship between a detection value of a temperature sensor and a threshold, and FIG. 6B is a table illustrating the relationship between detection results of an optical sensor and the temperature sensor, an environmental temperature, and a temperature lowering operation. In the graph of FIG. 6A, the vertical axis represents an analog-to-digital (AD) value output from the temperature sensor, and the horizontal axis represents control conditions of A to E. In the table of FIG. 6B, A to G denote control conditions.

An X direction in FIGS. 2 to 4 (including FIGS. 7 and 8) is a depth direction of the vehicle display device of the present embodiment. A Y direction is a width direction of the vehicle display device of the present invention and perpendicular to the depth direction. A Z direction is an up-down direction of the vehicle display device of the present invention and perpendicular to the depth direction and the width direction. Note that the Z direction may coincide with a vertical direction. Each direction used in the following description is the direction in a state in which members of the vehicle display device are assembled with each other, and the vehicle display device is mounted on the vehicle, unless otherwise specifically noted.

As illustrated in FIG. 1, a vehicle display device 1 is, for example, a head-up display device mounted on a vehicle 100, such as a motor vehicle. In the vehicle 100, the vehicle display device 1 is disposed inside an instrument panel 102 together with a meter 104 and projects a display image onto a windshield 103. The vehicle display device 1 projects the display image onto the windshield 103 as a projected member to display a virtual image S ahead of an eye point EP of a driver D. The windshield 103 has a transflective property for reflecting a part of incident light and transmits the other part thereof. Thus, the windshield 103 reflects the display image projected from the vehicle display device 1 as display light L to the eye point EP of the driver D while transmitting the scenery in front of the vehicle 100. The windshield 103 is disposed outside the vehicle display device 1. For example, the windshield 103 is disposed above the instrument panel 102. The eye point EP is previously determined as a visual point position of the driver D. The driver D recognizes the display image reflected by the windshield 103 as the virtual image S. The driver D recognizes the virtual image S as being located ahead of the windshield 103. The vehicle display device 1 of the present embodiment includes a housing 2, a reflecting mirror 3, a display device 5, a controller 7, and a driving unit 15.

For example, the housing 2 is made of a synthetic resin material and formed in a box-like shape. The housing 2 includes an internal space 17 inside thereof. As illustrated in FIG. 2, the housing 2 houses the display device 5, the reflecting mirror 3, the controller 7, and the driving unit 15 inside the internal space 17 and supports the display device 5, the reflecting mirror 3, the controller 7, and the driving unit 15. The housing 2 includes an opening 2a which allows the outside of the vehicle display device 1 and the internal space 17 to communicate with each other. The opening 2a is disposed on the housing 2 at a position facing the windshield 103. The vehicle display device 1 of the present embodiment emits the display light L from the housing 2 toward the windshield 103 through the opening 2a. The display light L is emitted from the display device 5 and reflected by the reflecting mirror 3.

As illustrated in FIG. 2, the reflecting mirror 3 is an optical system which is disposed on an optical path of the display light L from the display device 5 to the windshield 103 and reflects the display light L emitted from the display device 5 toward the windshield 103. The reflecting mirror 3 of the present embodiment includes a plane mirror 11 and a concave mirror 13. The plane mirror 11 includes a flat reflecting surface and is disposed at a position facing the display device 5. The plane mirror 11 totally reflects the display light L emitted from the display device 5 by the reflecting surface toward the concave mirror 13. The concave mirror 13 includes a concave curved (or convex curved) reflecting surface and is disposed at a position facing the plane mirror 11. The concave mirror 13 totally reflects the display light L reflected by the plane mirror 11 toward the windshield 103 through the opening 2a. The concave mirror 13 of the present embodiment has a function as a magnifying mirror. More specifically, the concave mirror 13 reflects the display image in a magnifying manner so that the display image represented by the display light L after reflected by the concave mirror 13 becomes larger than the display image represented by the display light L before reflected by the concave mirror 13. The concave mirror 13 of the present embodiment is turnably supported by the driving unit 15 and capable of changing a reflection angle of the display light L and external light SL. The external light SL is sunlight that enters the housing 2 through the opening 2a. In the present embodiment, the external light SL is concentrated by being reflected by the concave mirror 13 which functions as a magnifying mirror. Thus, the external light SL traveling to the display device 5 through the concave mirror 13 is concentrated light.

The display device 5 emits the display image to be projected onto the windshield 103 as the display light L. As illustrated in FIG. 3, the display device 5 includes a liquid crystal display unit 21 and a backlight unit 22. The liquid crystal display unit 21 is a liquid crystal panel and includes, for example, a light transmissive or transflective liquid crystal display element. The liquid crystal display unit 21 is disposed on an optical path of light emitted from a light source 32 (described below). A display surface on the front side of the liquid crystal display unit 21 emits light by being illuminated from the back side thereof. The liquid crystal display unit 21 has a function of transmitting the external light SL incident thereon from the plane mirror 11. The liquid crystal display unit 21, for example, transmits the incident external light SL toward a second optical member 34 without refracting the external light SL. The backlight unit 22 illuminates the liquid crystal display unit 21 from the back side thereof. The backlight unit 22 is disposed facing the plane mirror 11 of the reflecting mirror 3. The backlight unit 22 is driven by, for example, electric power obtained from a battery (not illustrated) inside the vehicle 100. The display device 5 includes the light source 32, a first optical member 33, the second optical member 34, an optical sensor 41, and a temperature sensor 29.

In the backlight unit 22, the light source 32 applies light to the liquid crystal display unit 21. The light source 32 is, for example, a light emitting diode (LED) as a light emitting element. For example, the light source 32 is mounted on a Light source substrate 31. For example, the light source substrate 31 is disposed on an inner bottom face of the display device 5. In addition to the light source 32, the optical sensor 41 is mounted on the light source substrate 31. The light source substrate 31 is electrically connected to the controller 7 and the battery.

The first optical member 33 is an optical lens and includes, for example, a lens array. The first optical member 33 is disposed between the liquid crystal display unit 21 and the light source 32. The first optical member 33 changes an optical path of light that enters the first optical member 33 from the light source 32 and passes therethrough toward the liquid crystal display unit 21. The first optical member 33 is disposed facing the light source 32 in the up-down direction. For example, the first optical member 33 has a function of refracting light applied thereto from the light source 32 to parallel light and transmitting the parallel light toward the second optical member 34. As illustrated in FIG. 4, the first optical member 33 of the present embodiment includes a passage 33a on an optical path through which the external light SL passes. The passage 33a is disposed on one end of the first optical member 33 in the width direction. When the first optical member 33 is viewed in the up-down direction, the passage 33a is formed by cutting away the end of the first optical member 33 in a recessed shape (U shape). The external light SL passes through a space inside the passage 33a. The passage 33a is disposed on substantially the center of one side of the first optical member 33 in the width direction. The first optical member 33 includes a transmissive area 51 which transmits light applied thereto from the light source 32 and a non-transmissive area 52 other than the transmissive area 51. The transmissive area 51 is an area where light emitted from the light source 32 to the first optical member 33 strikes in order to obtain the required display light L. The transmissive area 51 refracts light applied thereto from the light source 32 to parallel light and transmits the parallel light toward the second optical member 34. The non-transmissive area 52 is an area other than the transmissive area 51 and, for example, includes an area where light emitted from the light source 32 does not have to strike. In other words, the non-transmissive area 52 includes an area that does not have to transmit light applied thereto from the light source 32. The passage 33a is formed in the non-transmissive area 52. The passage 33a is formed in an area that does not obstruct light that is emitted from the yacht source 32 and necessary for the display light L in the first optical member 33. The first optical member 33 includes four attached portions 42 which are disposed on corners on two intersecting diagonal lines. The attached portions 42 are attached to a housing 20 of the display device 5. The attached portions 42 are formed in the non-transmissive area 52 as with the passage 33a.

The second optical member 34 is an optical lens and disposed between the liquid crystal display unit 21 and the first optical member 33. The second optical member 34 changes light that enters the second optical member 34 from the first optical member 33 and passes therethrough toward the liquid crystal display unit 21. The second optical member 34 is disposed facing the light source 32 in the up-down direction across the first optical member 33 and disposed facing the liquid crystal display unit 21 in the up-down direction. For example, the second optical member 34 has a function of diffusing light incident thereon from the first optical member 33. The second optical member 34 refracts light incident thereon from the first optical member 33 so that the light is diffused to an area adequate for the liquid crystal display unit 21 and transmits the refracted light toward the liquid crystal display unit 21. The second optical member 34 transmits the external light SL incident thereon from the liquid crystal display unit 21 toward the first optical member 33.

The optical sensor 41 detects the external light SL that enters the housing 2 through the opening 2a and enters the display device 5 through the reflecting mirror 3. The optical sensor 41 is disposed on an optical path of the external light SL incident on the display device 5 at the side opposite to the liquid crystal display unit 21 across the first optical member 33. The optical sensor 41 includes, for example, an infrared sensor and detects light in the infrared region (infrared rays) included in the external light SL. Specifically, the optical sensor 41 receives light in the infrared region (infrared rays) included in the external light SL converts the received light to an electric signal, and outputs the electric signal as a detection signal to the controller 7.

The temperature sensor 29 detects the temperature of the display device 5. The temperature sensor 29 includes, for example, a thermistor, a thermocouple, a resistance temperature detector (RTD), or an IC temperature sensor. The temperature sensor 29 is disposed in the internal space of the display device 5. For example, the temperature sensor 29 is disposed near the liquid crystal display unit 21 or the backlight unit 22. The temperature sensor 29 is electrically connected to the controller 7 and outputs a detection value detected by the temperature sensor 29 as a detection signal to the controller 7. For example, the temperature sensor 29 may output the detection signal to the controller 7 at regular intervals or in response to a request from the controller 7.

As illustrated in FIG. 2, the controller 7 is electrically connected to the display device 5 and the driving unit 15 and controls operations of the display device 5 and the driving unit 15. The controller 7 includes, for example, an IC chip and is driven by electric power obtained from the battery inside the vehicle 100. For example, when the optical sensor 41 detects the external light SL, the controller 7 enables execution of a temperature lowering operation for lowering the temperature of the display device 5. The temperature lowering operation includes, for example, dimming or turning off lighting of the display device 5 and changing the reflection angle of the reflecting mirror 3. Specifically, when the optical sensor 41 detects the external light SL, the controller 7 transmits a dimming signal or a turn-off signal to the display device 5 in accordance with the detection signal received from the optical sensor 41 to dim or turn off lighting of the display device 5 (first temperature lowering operation). Further, when the optical sensor 41 detects the external light SL, the controller 7 transmits a driving signal to the driving unit 15 in accordance with the detection signal received from the optical sensor 41 to change the reflection angle of the concave mirror 13 by the driving unit 15 (second temperature lowering operation). When the optical sensor 41 detects the external light SL, the controller 7 controls the display device 5 and the driving unit 15 so as to execute one or both of the first temperature lowering operation and the second temperature lowering operation.

Further, the controller 7 compares the detection value received from the temperature sensor 29 with a threshold which is previously held. The threshold is a reference temperature at which the display device 5 can emit the display light L with an appropriate luminance and also a lower limit temperature in an operating temperature range in which the backlight unit 22 inside the display device 5 can emit the display light L with the appropriate luminance. Thus, the threshold is different from a temperature at which the liquid crystal display unit 21 may be broken (here, referred to as a limit temperature), and a relationship of the threshold<the limit temperature is satisfied. The controller 7 determines whether to enable execution of the temperature lowering operation described above in accordance with a detection result of the external light SL by the optical sensor 41 and a result of the comparison between the detection value of the temperature sensor 29 and the threshold. Specifically, when the optical sensor 41 detects the external light, and the detection value of the temperature sensor 29 is higher than the threshold, the controller 7 enables execution of the temperature lowering operation. On the other hand, when the optical sensor 41 detects the external light SL, but the detection value of the temperature sensor 29 is lower than the threshold, the controller 7 restricts execution of the temperature lowering operation.

For example, the driving unit 15 has a structure combining a motor and a gear and changes the reflection angle of the concave mirror 13. The driving unit 15 is electrically connected to the controller 7 and driven in accordance with the driving signal from the controller 7. For example, the driving unit 15 has a structure in which the gear which is attached to a rotation shaft of the motor is meshed with teeth which are disposed on the concave mirror 13 at the side opposite to the reflecting surface. When the driving unit 15 receives the driving signal from the controller 7, the rotation shaft of the motor rotates, and the power of the motor is transmitted to the concave mirror 13 by meshing of the gear of the motor with the teeth of the concave mirror 13, which turns the concave mirror 13 to change the reflection angle of the concave mirror 13.

Next, a display operation in the vehicle display device 1 will be described with reference to FIGS. 1 and 2. First, the display light L emitted from the display device 5 travels to the plane mirror 11. The plane mirror 11 reflects the display light L incident thereon from the display device 5 toward the concave mirror 13. The concave mirror 13 reflects the display light L incident thereon from the plane mirror 11 toward the windshield 103 through the opening 2a by the concave reflecting surface. Accordingly, a display image corresponding to the display light L is projected onto the windshield 103, and the virtual image S is displayed ahead of the eye point EP of the driver D.

Next, the temperature lowering operation in the vehicle display device 1 will be described with reference to FIGS. 3, 5, 6A, and 6B. First, the external light SL that has entered the housing 2 through the opening 2a is partially or totally reflected by the concave mirror 13 toward the plane mirror 11. The plane mirror 11 partially or totally reflects the external light SL from the concave mirror 13 toward the display device 5. In the display device 5, the liquid crystal display unit 21 partially reflects and partially transmits the external light SL (transflection). The external light SL that has passed through the liquid crystal display unit 21 passes through the second optical member 34 and reaches the first optical member 33, and partially passes through the passage 33a of the first optical member 33 and travels to the optical sensor 41. When the optical sensor 41 detects infrared rays in response to the reception of the external light SL (YES in Step S1), the optical sensor 41 outputs a detection signal to the controller 7. Upon receiving the detection signal from the optical sensor 41, the controller 7 compares a detection value detected by the temperature sensor 29 with the threshold (Step S2). When the detection value is lower than the threshold (YES in Step S2), the controller 7 restricts execution of the temperature lowering operation. For example, the controller 7 does not transmit the dimming signal or the turn-off signal to the display device 5. On the other hand, when the controller 7 receives the detection signal from the optical sensor 41, and the detection value of the temperature sensor 29 is higher than the threshold (NO in Step S2), the controller 7 enables execution of the temperature lowering operation (Step S3). For example, the controller 7 transmits the dimming signal or the turn-off signal to the display device 5. When the display device 5 receives the dimming signal from the controller 7, the display device 5 dims the backlight unit 22. On the other hand, when the display device 5 receives the turn-off signal from the controller 7, the display device 5 turns off the backlight unit 22.

When the optical sensor 41 detects the external light SL, the controller 7 enables execution of the temperature lowering operation of the display device 5. However, when the temperature lowering operation of the display device 5, for example, dimming or turning off of lighting of the display device 5 is performed under a low-temperature environment where the luminance during lighting is reduced, there is a low possibility that the display device 5 is immediately broken even if the temperature of the liquid crystal display unit 21 increases by the application of the external light SL. When lighting of the display device 5 is dimmed or turned off even though the display device 5 has a temperature that does not cause breakage of the display device 5, the display quality may be deteriorated due to an insufficient luminance. Thus, when the optical sensor 41 detects the external light SL, and the detection value of the temperature sensor 29 is lower than the threshold, the controller 7 restricts dimming or turning off of lighting of the display device 5. That is, when the optical sensor 41 detects the external light SL, and the detection value of the temperature sensor 29 is lower than the threshold, the controller 7 controls each member so as not to execute the temperature lowering operation.

Under a condition A illustrated in FIGS. 6A and 6B where the optical sensor 41 detects no external light SL (NOT DETECTED), and the detection value of the temperature sensor 29 (AD VALUE: 5) is lower than a threshold T0 (AD VALUE: 14), the controller 7 disables execution of the temperature lowering operation (NOT EXECUTED) even when the environmental temperature is NOK (NOT OK). The environmental temperature is appropriately determined according to the environment of a location where the display device 5 is disposed. NOK is determined when the environmental temperature is higher than a predetermined value, and OK is determined when the environmental temperature is lower than the predetermined value. For example, the environmental temperature is detected by a temperature sensor (not illustrated) that is different from the temperature sensor 29. Alternatively, the detection value of the temperature sensor 29 may be used as the environmental temperature. On the other hand, under a condition G illustrated in FIG. 6B where the optical sensor 41 detects no external light SL (NOT DETECTED), and the detection value of the temperature sensor 29 is lower than the threshold T0, the controller 7 disables execution of the temperature lowering operation (NOT EXECUTED) even when the environmental temperature is OK.

Under conditions B, D, E illustrated in FIGS. 6A and 6B where the optical sensor 41 detects the external light SL (DETECTED), and the detection value of the temperature sensor 29 (AD VALUE: 10, 13.5, 7) is lower than the threshold T0 (AD VALUE: 14), the controller 7 disables execution of the temperature lowering operation (NOT EXECUTED) even when the environmental temperature is NOK. Further, under a condition F where the optical sensor 41 detects the external light SL (DETECTED), and the detection value of the temperature sensor 29 is lower than the threshold T0, the controller 7 disables execution of the temperature lowering operation (NOT EXECUTED) even when the environmental temperature is OK. On the other hand, under a condition C where the optical sensor 41 detects the external light SL (DETECTED), and the detection value of the temperature sensor 29 (AD VALUE: 18) is equal to or higher than the threshold T0 (AD VALUE: 14), the controller 7 enables execution of the temperature lowering operation (EXECUTED) even when the environmental temperature is NOK. In FIG. 6A, T1 denotes the detection value of the temperature sensor 29 when the light source 32 is in an on state, and T2 denotes the detection value of the temperature sensor 29 when the temperature has risen by lighting of the light source 32 and the entry of the external light SL.

As described above, in the vehicle display device 1 according to the first embodiment, the display device 5 includes the light source 32, the light transmissive liquid crystal display unit 21 which is disposed on the optical path of light emitted from the light source 32, and the first optical member 33 which is disposed between the liquid crystal display unit 21 and the light source 32 and changes the optical path of light that enters the first optical member 33 from the light source 32 and passes therethrough toward the liquid crystal display unit 21. The optical sensor 41 is disposed on the optical path of the external light SL incident on the display device 5 at the side opposite to the liquid crystal display unit 21 across the first optical member 33. The first optical member 33 includes the passage 33a on the optical path through which the external light SL passes.

According to the above configuration, the external light SL that enters the display device 5 and reaches the optical sensor 41 passes though the passage 33a without passing through the first optical member 33. Thus, it is possible to prevent reduction in the detection accuracy of the optical sensor 41 caused by reduction in the amount of light due to the external light SL passing through the first optical member 33. That is, it is possible to improve the accuracy of detecting the external light SL by the optical sensor 41. Thus, the temperature lowering operation can be executed at an appropriate timing. Accordingly, it is possible to prevent optical deterioration of the display device 5 caused by the external light SL and prevent breakage of the display device 5 caused by the external light SL. For example, when the amount of light is reduced by 20% by the external light SL passing through the first optical member 33, the detection capacity of the optical sensor 41 can be increased by 20% by detecting the external light SL that has passed through the passage 33a. Further, the passage 33a can reduce light that is emitted from the light source 32, reflected by the first optical member 33, and travels to the optical sensor 41. Thus, detection of light from the light source 32 by the optical sensor 41 is reduced, which makes it possible to improve the accuracy of detecting external light by the optical sensor 41. Further, the optical sensor 41 is disposed on the optical path of the external light SL incident on the display device 5. Thus, the vehicle display device 1 can be downsized as compared to, for example, the case where the optical sensor 41 is disposed outside the display device 5 and inside the housing 2. Further, the optical sensor 41 can be integrally incorporated in the display device 5. Thus, commonality of the display device 5 with respect to the vehicle display device 1 can be achieved.

In the vehicle display device 1, the display device 5 further includes the second optical member 34 which is disposed between the liquid crystal display unit 21 and the first optical member 33 and changes light that enters the second optical member 34 from the first optical member 33 and passes therethrough toward the liquid crystal display unit 21. This makes it possible to change the optical path of light applied to the liquid crystal display unit 21 from the light source 32 corresponding to the liquid crystal display unit 21.

The vehicle display device 1 includes the passage 33a which is formed in the non-transmissive area 52 of the first optical member 33. Thus, the passage 33a can be formed on the first optical member 33 without limiting light that passes through the first optical member 33 and reaches the liquid crystal display unit 21.

In the vehicle display device 1, the display device 5 includes the temperature sensor 29 inside thereof. Thus, the temperature of the display device 5 can be accurately measured by the temperature sensor 29 disposed inside the display device 5. When the optical sensor 41 detects the external light SL, and the detection value of the temperature sensor 29 is lower than the threshold, the controller 7 restricts execution of the temperature lowering operation. Thus, even when the external light SL enters the display device 5 under the low-temperature environment where the luminance of the display device 5 during lighting is reduced, the temperature lowering operation is restricted, which enables prevention of reduction in the display quality.

Second Embodiment

Figure 7:
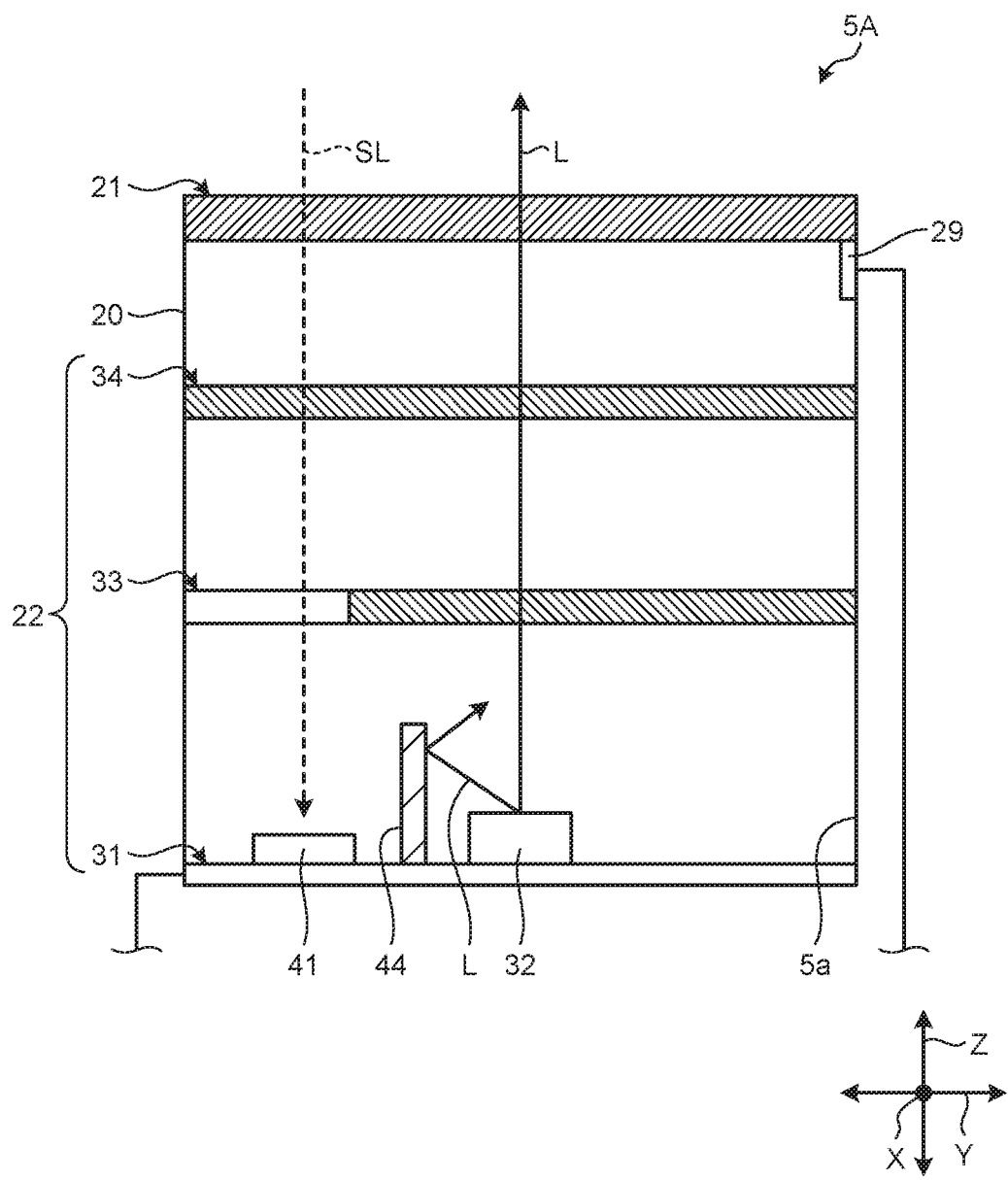
FIG. 7 is a schematic diagram illustrating the schematic configuration of a display device according to a second embodiment.

Next, a vehicle display device according to a second embodiment will be described with reference to FIG. 7. FIG. 7 is a schematic diagram illustrating the schematic configuration of a display device according to the second embodiment.

A vehicle display device 1 according to the second embodiment differs from the vehicle display device 1 according to the first embodiment in that a display device 5 is provided with a light-shielding wall 44 inside thereof. In the following description, elements common between the first and second embodiments are designated by the same reference signs, and detailed description thereof will be omitted or simplified.

The light-shielding wall 44 is disposed between the light source 32 and the optical sensor 41 and blocks light traveling from the light source 32 to the optical sensor 41. For example, the light-shielding wall 44 is made of an opaque synthetic resin material that does not transmit light applied thereto from the light source 32 and formed in a flat plate-like shape. The light-shielding wall 44 is integrated with the light source substrate 31 and mounted in a standing manner on the light source substrate 31. The light-shielding wall 44 preferably has an up-down length that prevents the light-shielding wall 44 from having contact with the first optical member 33 and has a length, a thickness, a shape that prevent the light-shielding wall 44 from blocking light traveling from the light source 32 to the first optical member 33. The light-shielding wall 44 preferably has a length, a thickness, and a shape that prevent the light-shielding wall 44 from blocking the optical path of the passage 33a through which the external light SL passes. The light-shielding wall 44 preferably has a heat-resistant property because light directly applied to the light-shielding wall 44 from the light source 32 generates heat.

As described above, in the vehicle display device 1 according to the second embodiment, the display device 5 includes the light-shielding wall 44 between the light source 32 and the optical sensor 41. Thus, the light-shielding wall 44 blocks light that is emitted from the light source 32 and directly travels to the optical sensor 41. Thus, detection of light from the light source 32 by the optical sensor 41 is reduced, which makes it possible to further improve the accuracy of detecting external light by the optical sensor 41.

Although, in the second embodiment, the light-shielding wall 44 is integrated with the light source substrate 31 and mounted in a standing manner on the light source substrate 31, the present invention is not limited thereto. For example, the light-shielding wall 44 may be separated from the light source substrate 31 and mounted in a standing manner on an inner bottom face of the housing 20 of the display device 5.

Although the second embodiment describes the case where the display device 5 includes the first optical member 33 which includes the passage 33a, the present invention is not limited thereto. The display device 5 may include a first optical member 33 which does not include the passage 33a.

Figure 8:
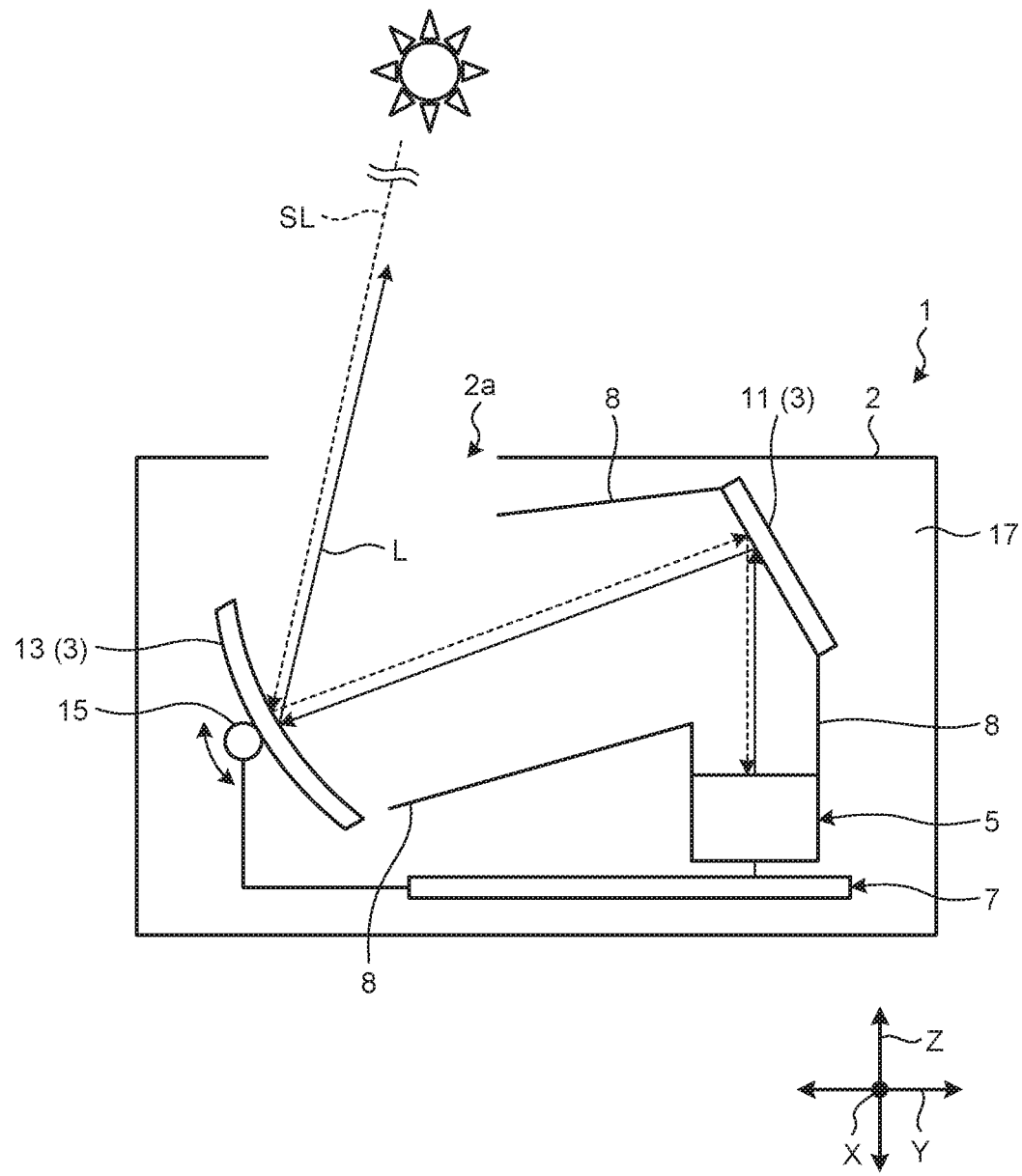
FIG. 8 is a schematic diagram illustrating the schematic configuration of a vehicle display device according to a first modification.

Next, a vehicle display device according to a first modification of the first and second embodiments will be described with reference to FIG. 8. FIG. 8 is a schematic diagram illustrating the schematic configuration of the vehicle display device according to the first modification. A vehicle display device 1 according to the first modification differs from the vehicle display devices 1 according to the first and second embodiments in that the housing 2 includes an inner housing 8 inside thereof. In the following description, elements common between the first modification and the first and second embodiments are designated by the same reference signs, and detailed description thereof will be omitted or simplified.

The inner housing 8 is molded of, for example, a synthetic resin material. The inner housing 8 is housed in the internal space 17 of the housing 2 to partition the internal space 17. The inner housing 8 mainly supports the reflecting mirror 3, the display device 5, and the controller 7. The inner housing 8 secures the optical path of the display light L from the display device 5 to the opening 2a of the housing 2.

In the vehicle display device 1 according to the first modification described above, the optical sensor 41 can receive only the external light SL that enters the display device 5 through the reflecting mirror 3. Thus, the accuracy of detecting the external light SL by the optical sensor 41 can be further improved.

Figure 9:
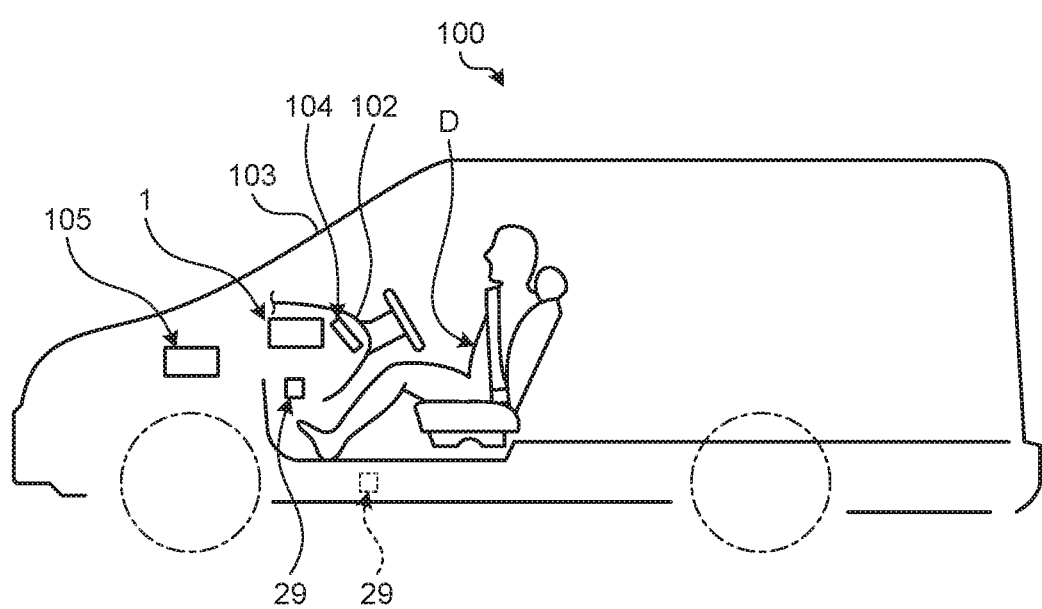
FIG. 9 is a schematic diagram illustrating a disposition example of a temperature sensor according to a second modification.

Next, a vehicle display device according to a second modification of the first and second embodiments will be described with reference to FIG. 9. FIG. 9 is a schematic diagram illustrating a disposition example of a temperature sensor device according to the second modification. A vehicle display device 1 according to the second modification differs from the vehicle display devices 1 according to the first and second embodiments in that a temperature sensor 29 is disposed outside the vehicle display device 1 (outside the housing 2).

The temperature sensor 29 may be disposed, for example, inside the instrument panel 102 inside the vehicle 100 (indicated by a solid line in FIG. 9), or may be disposed under a floor panel (indicated by a broken line in FIG. 9).

When the controller 7 in the modification obtains a detection value from the temperature sensor 29 that is disposed inside the vehicle 100 and outside the housing 2, the controller 7 compares the detection value with a threshold (a second threshold corresponding to the temperature inside the vehicle 100) that is different from the threshold described above (the first threshold corresponding to the internal temperature of the display device 5). The second threshold is an estimated temperature inside the vehicle when the backlight unit 22 can emit the display light L with an appropriate luminance. On the other hand, when the controller 7 obtains a detection value from the temperature sensor 29 that is disposed outside the vehicle and outside the housing 2, the controller 7 compares the detection value with a threshold (a third threshold corresponding to the temperature outside the vehicle 100) that is different from the first threshold and the second threshold. The third threshold is an estimated temperature outside the vehicle when the backlight unit 22 can emit the display light L with an appropriate luminance. In this manner, the controller 7 compares the detection value with different thresholds according to the disposing position of the temperature sensor 29.

The vehicle display device 1 according to the second modification described above includes the temperature sensor 29 which is disposed inside the vehicle 100 and outside the vehicle display device 1. When the optical sensor 41 detects the external light SL, and the detection value of the temperature sensor 29 is equal to or lower than the threshold (the second threshold or the third threshold), the controller 7 restricts execution of the temperature lowering operation. Accordingly, for example, when the vehicle 100 is placed under the low-temperature environment, the temperature lowering operation is restricted even when the external light SL enters the display device 5. Thus, in addition to the effects of the first embodiment, reduction in the display quality can be prevented. Further, since the temperature sensor 29 is not disposed inside the vehicle display device 1, it is possible to ensure a sufficient flexibility of the layout of the temperature sensor 29, which contributes to downsizing of the housing 2.

When the optical sensor 41 detects the external light SL, and the detection value of the temperature sensor 29 is higher than the threshold (the first threshold, the second threshold, or the third threshold), the controller 7 controls the display device 5 and the driving unit 15 so as to execute one or both of the first temperature lowering operation and the second temperature lowering operation. However, the present invention is not limited thereto. For example, when the optical sensor 41 detects the external light SL, and the detection value of the temperature sensor 29 is higher than the threshold, the controller 7 may perform stepwise control so as to execute one of the first temperature lowering operation and the second temperature lowering operation and then execute both of the first temperature lowering operation and the second temperature lowering operation.

Although, in the first and second embodiments and the modifications thereof, the vehicle display device 1 includes the reflecting mirror 3 which includes the plane mirror 11 and the concave mirror 13, the present invention is not limited thereto. The vehicle display device 1 may include one reflecting mirror 3, or may include three or more reflecting mirrors 3. Further, the plane mirror 11 may be a concave mirror, or may be, for example, a convex mirror, an aspherical mirror, a spherical mirror, or a freeform mirror. The concave mirror 13 may be, for example, a convex mirror, an aspherical mirror, a spherical mirror, or a freeform mirror. The positions of the display device 5 and the reflecting mirror 3 are not limited to the illustrated positions.

Although, in the first and second embodiments and the modifications thereof, the concave mirror 13 has a function as a magnifying mirror, the present invention is not limited thereto. The concave mirror 13 may have a function as a correction mirror. Although the concave mirror 13 is turnably supported by the driving unit 15, the present invention is not limited thereto. The concave mirror 13 may be fixedly supported by the housing 2 or the inner housing 8. Although the plane mirror 11 is fixedly supported by the housing 2 or the inner housing 8, the plane mirror 11 may be turnably supported by the driving unit 15 as with the concave mirror 13.

In the first and second embodiments and the modifications thereof, the opening 2a may be closed with a transparent cover that transmits the display light L. The transparent cover closes the opening 2a to prevent dust from entering the housing 2 from the outside.

Although, in the first and second embodiments and the modifications thereof, the display device 5 is a liquid crystal type, the display device 5 may be another type, for example, a laser type, a digital light processing type, or a projector type. An inner wall surface 5a of the housing 20 of the display device 5 may be mirror-finished, or may be made of a white material. This facilitates reflection of the external light SL by the inner wall surface 5a, which increases the external light SL that is reflected by the inner wall surface 5a and travels to the optical sensor 41. Thus, it is possible to improve the accuracy of detecting the external light SL by the optical sensor 41.

Although, in the first and second embodiments and the modifications thereof, the passage 33a is formed by cutting away the first optical member 33 in a recessed shape (U shape) when the first optical member 33 is viewed in the up-down direction, the present invention is not limited thereto. The passage 33a may be, for example, a through hole including an opening having a circular, an elliptical, or a polygonal shape. Although one passage 33a is formed on the first optical member 33 corresponding to one optical sensor 41, the present invention is not limited thereto. A plurality of passages 33a may be formed corresponding to the number of optical sensors 41.

Although, in the first and second embodiments and the modifications thereof, the non-transmissive area 52 is formed in a band shape surrounding the transmissive area 51 when the first optical member 33 is viewed in the up-down direction, the present invention is not limited thereto.

Although, in the first and second embodiments and the modifications thereof, the light-shielding wall 44 is made of a material that does not transmit light applied thereto from the light source 32, the present invention is not limited thereto. For example, the light-shielding wall 44 may be made of a material that transmits light having a wavelength that cannot be detected by the optical sensor 41. In other words, the light-shielding wall 44 may be made of a material that blocks light having a wavelength that can be detected by the optical sensor 41.

Although, in the first and second embodiments and the modifications thereof, the display device 5 includes one optical sensor 41 inside thereof, the present invention is not limited thereto. The display device 5 may include a plurality of optical sensors 41 inside thereof. In this case, a plurality of optical sensors 41 may be disposed at the same position or different positions where the external light SL reflected by the display device 5 enters. Although the optical sensor 41 is an infrared sensor, the optical sensor 41 may be, for example, an illuminance sensor that is capable of detecting the external light SL. When the optical sensor 41 is an illuminance sensor, the optical sensor 41 receives light in the visible region (visible rays) included in the external light SL, converts the received light to an electric signal, and outputs the electric signal to the controller 7. The optical sensor 41 may include one of the infrared sensor and the illuminance sensor, or may include both of the infrared sensor and the illuminance sensor.

Although, in the first and second embodiments and the modifications thereof, the temperature sensor 29 directly outputs the detection value to the controller 7, the present invention is not limited thereto. For example, the temperature sensor 29 may output the detection value to the controller 7 through the meter 104 or an ECU 105. A plurality of temperature sensors 29 may be disposed at different positions in the vehicle 100. For example, the temperature sensors 29 may be disposed inside the display device 5, and inside and outside the vehicle 100. In this case, the temperature sensors 29 output different detection values. Thus, the controller 7 may select one of the detection values on the basis of a certain condition and compare the selected detection value with the threshold corresponding to the temperature sensor 29 that has output the selected detection value to restrict execution of the temperature lowering operation. This temperature lowering operation includes both of the first temperature lowering operation and the second temperature lowering operation.

Although, in the first and second embodiments and the modifications thereof, when the optical sensor 41 detects the external light SL, the controller 7 controls the display device 5 and the driving unit 15 so as to execute one of the first temperature lowering operation and the second temperature lowering operation, the present invention is not limited thereto. For example, when the optical sensor 41 detects the external light SL, the controller 7 may control the display device 5 and the driving unit 15 so as to simultaneously execute both of the first temperature lowering operation and the second temperature lowering operation. Alternatively, when the optical sensor 41 detects the external light SL, the controller 7 may perform stepwise control so as to execute one of the first temperature lowering operation and the second temperature lowering operation and then execute the other of the first temperature lowering operation and the second temperature lowering operation. The controller 7 may be electrically connected to the electronic controller (ECU) 105 inside the vehicle 100 illustrated in FIG. 9 and exchange signals with the ECU 105.

Although, in the first and second embodiments and the modifications thereof, the vehicle display device 1 projects the display image onto the windshield 103 of the vehicle 100, the present invention is not limited thereto. For example, the display image may be projected onto a combiner.

Although, in the first and second embodiments and the modifications thereof, the vehicle display device 1 is applied to the vehicle 100, such as a motor vehicle, the present invention is not limited thereto. For example, the vehicle display device 1 may be applied to not the vehicle 100, but a ship or an airplane.

The vehicle display device according to the present embodiment achieves effects of preventing optical deterioration of a display device caused by external light and preventing breakage of the display device caused by external light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a display device configured to emit, as display light, a display image to be projected onto a projected member disposed outside the vehicle display device;
   at least one reflecting mirror disposed on an optical path of the display light from the display device to the projected member and configured to reflect the display light;
   an optical sensor configured to detect external light that enters the display device through an opening allowing the outside and an internal space to communicate with each other and through the reflecting mirror; and
   a controller configured to enable execution of a temperature lowering operation for lowering a temperature of the display device when the optical sensor detects the external light, wherein
   the display device includes:
   a light source;
   a light transmissive liquid crystal display element disposed on an optical path of light emitted from the light source; and
   a first optical member disposed between the liquid crystal display element and the light source and configured to change an optical path of light that enters from the light source and passes through the first optical member toward the liquid crystal display element,
   the optical sensor is disposed on an optical path of external light incident on the display device at a side opposite to the liquid crystal display element across the first optical member,
   the first optical member includes a cutout portion provided on the end of the first optical member in a recessed shape on an optical path through which the external light passes, when the first optical member is viewed in the up-down direction, and
   the first optical member includes:
   a transmissive area configured to transmit light applied to the transmissive area from the light source; and
   a non-transmissive area other than the transmissive area, and
   the non-transmissive area includes the cutout portion.

2. The vehicle display device according to claim 1, wherein
   the display device further includes a second optical member disposed between the liquid crystal display element and the first optical member and configured to change light that enters from the first optical member and passes through the second optical member toward the liquid crystal display element, and the second optical member transmits the external light.

3. The vehicle display device according to claim 1, wherein the display device further includes a light-shielding wall disposed between the light source and the optical sensor and configured to block light emitted from the light source.

4. The vehicle display device according to claim 2, wherein the display device further includes a light-shielding wall disposed between the light source and the optical sensor and configured to block light emitted from the light source.

5. The vehicle display device according to claim 1 wherein the optical sensor is an infrared sensor.

6. The vehicle display device according to claim 2 wherein the optical sensor is an infrared sensor.

7. The vehicle display device according to claim 3 wherein the optical sensor is an infrared sensor.

8. The vehicle display device according to claim 1, further comprising:

a temperature sensor configured to detect the temperature of the display device, wherein the controller restricts execution of the temperature lowering operation when the optical sensor detects the external light, and a detection value of the temperature sensor is lower than a threshold.

9. The vehicle display device according to claim 2, further comprising:

a temperature sensor configured to detect the temperature of the display device, wherein the controller restricts execution of the temperature lowering operation when the optical sensor detects the external light, and a detection value of the temperature sensor is lower than a threshold.

10. The vehicle display device according to claim 3, further comprising:

a temperature sensor configured to detect the temperature of the display device, wherein the controller restricts execution of the temperature lowering operation when the optical sensor detects the external light, and a detection value of the temperature sensor is lower than a threshold.

11. The vehicle display device according to claim 5, further comprising:

a temperature sensor configured to detect the temperature of the display device, wherein the controller restricts execution of the temperature lowering operation when the optical sensor detects the external light, and a detection value of the temperature sensor is lower than a threshold.

12. The vehicle display device according to claim 1, further comprising:

a temperature sensor disposed at least inside a vehicle and disposed outside the vehicle display device, wherein the controller restricts execution of the temperature lowering operation when the optical sensor detects the external light, and a detection value of the temperature sensor is lower than a threshold.

13. The vehicle display device according to claim 2, further comprising:

a temperature sensor disposed at least inside a vehicle and disposed outside the vehicle display device, wherein the controller restricts execution of the temperature lowering operation when the optical sensor detects the external light, and a detection value of the temperature sensor is lower than a threshold.

14. A vehicle display device comprising:

a display device configured to emit, as display light, a display image to be projected onto a projected member disposed outside a vehicle display device;

at least one reflecting mirror disposed on an optical path of the display light from the display device to the projected member and configured to reflect the display light;

an infrared sensor configured to detect external light that enters the display device through an opening allowing the outside and an internal space to communicate with each other and through the reflecting mirror;

a temperature sensor configured to detect a temperature of the display device; and a controller configured to enable execution of a temperature lowering operation for lowering the temperature of the display device in accordance with a detection result of the infrared sensor and a detection result of the temperature sensor, wherein the display device includes:

a light source;

a light transmissive liquid crystal display element disposed on an optical path of light emitted from the light source; and a first optical member disposed between the liquid crystal display element and the light source and configured to change an optical path of light that enters from the light source and passes through the first optical member toward the liquid crystal display element, the infrared sensor is disposed on an optical path of external light incident on the display device at a side opposite to the liquid crystal display element across the first optical member, the first optical member includes a cutout portion provided on the end of the first optical member in a recessed shape on an optical path through which the external light passes, when the first optical member is viewed in the up-down direction, the first optical member includes:

a transmissive area configured to transmit light applied to the transmissive area from the light source; and a non-transmissive area other than the transmissive area, and the non-transmissive area includes the cutout portion, and the controller enables execution of the temperature lowering operation when the infrared sensor detects the external light, and a detection value of the temperature sensor is equal to or higher than a threshold and restricts execution of the temperature lowering operation when the infrared sensor detects the external light, and the detection value of the temperature sensor is lower than a threshold.

* * * * *